United States Patent [19]

Yagasaki

[11] Patent Number: 5,475,501
[45] Date of Patent: Dec. 12, 1995

[54] PICTURE ENCODING AND/OR DECODING METHOD AND APPARATUS

[75] Inventor: Yoichi Yagasaki, Kanagawa, Japan

[73] Assignee: Sony Corporation, Tokyo, Japan

[21] Appl. No.: 951,111

[22] Filed: Sep. 25, 1992

[30] Foreign Application Priority Data

Sep. 30, 1991 [JP] Japan ................... 3-278819
Sep. 30, 1991 [JP] Japan ................... 3-278820

[51] Int. Cl.$^6$ ................................... H04N 7/32
[52] U.S. Cl. ............ 358/426; 358/433; 348/420
[58] Field of Search ................ 358/426, 261.1, 358/261.2, 261.3, 430, 432, 433; 348/14, 15, 17, 18, 19, 420, 421, 422

[56] References Cited

U.S. PATENT DOCUMENTS

| | | |
|---|---|---|
| 4,633,312 | 12/1986 | Yasuda . |
| 4,754,336 | 6/1988 | Nishizawa . |
| 4,953,019 | 8/1990 | Skikakura et al. . |
| 4,982,285 | 1/1991 | Sugiyama ............... 358/136 |
| 5,040,060 | 8/1991 | Owada et al. . |
| 5,051,840 | 9/1991 | Watanabe et al. . |
| 5,103,307 | 4/1992 | Sugiyama ............... 358/136 |
| 5,267,037 | 11/1993 | Sugiyama ............... 358/136 |

FOREIGN PATENT DOCUMENTS

| | | |
|---|---|---|
| 0439624 | 8/1991 | European Pat. Off. . |
| 0531041 | 3/1993 | European Pat. Off. . |
| 0549813 | 7/1993 | European Pat. Off. . |

OTHER PUBLICATIONS

Signal Processing—Image Communication vol. 2, No. 2, Aug. 1990, Elsevier, Amsterdam, NL; pp. 221–239 CCITT Working Party XV/1 'Draft version of recommendation h261: video codec for audiovisual services at px64kbit/s'*section 3: 'Source coder' on pp. 223–266* *figure 3*.

Le Techniques De L'Ingenieur—Partie E6600 Jun. 1986, Paris pp. 1–11 C. J. Richard 'Compression du signal video'.

*Primary Examiner*—Bentsu Ro
*Attorney, Agent, or Firm*—William S. Frommer; Alvin Sinderbrand

[57] ABSTRACT

A picture encoding and/or decoding system adaptively changes encoding manner in discrete cosine transformation or predictive coding for improving a picture quality of transmission picture. A variable length coding method is changed in accordance with the change between the discrete cosine transformation and predictive coding. When discrete cosine transforming, a combination of a zero run length and a pixel value is effected two dimensional variable length coding. When predictive coding, a combination of a zero run length and a difference value between pixel values is effected two dimensional variable length coding. When predictive coding, a predictive value of a block and a quantization width are transmitted.

22 Claims, 19 Drawing Sheets

FIG. 3A

| 100 | 90 | 80 | 70 | 60 | 50 | 40 | 30 |
|---|---|---|---|---|---|---|---|
| 90 | 80 | 70 | 60 | 50 | 40 | 30 | 40 |
| 80 | 70 | 60 | 50 | 40 | 30 | 40 | 50 |
| 70 | 60 | 50 | 40 | 30 | 40 | 50 | 60 |
| 60 | 50 | 40 | 30 | 40 | 50 | 60 | 70 |
| 50 | 40 | 30 | 40 | 50 | 60 | 70 | 80 |
| 40 | 30 | 40 | 50 | 60 | 70 | 80 | 90 |
| 30 | 40 | 50 | 60 | 70 | 80 | 90 | 100 |

⇩ DCT ⇩

FIG. 3B

| 450 | 0 | 45 | 0 | 10 | 0 | 3 | 0 |
|---|---|---|---|---|---|---|---|
| 0 | 131 | 0 | 0 | 0 | 0 | 0 | 0 |
| 45 | 0 | -34 | 0 | 0 | 0 | 0 | 0 |
| 0 | 0 | 0 | 16 | 0 | 0 | 0 | 0 |
| 10 | 0 | 0 | 0 | -10 | 0 | 0 | 0 |
| 0 | 0 | 0 | 0 | 0 | 7 | 0 | 0 |
| 3 | 0 | 0 | 0 | 0 | 0 | -6 | 0 |
| 0 | 0 | 0 | 0 | 0 | 0 | 0 | 5 |

⇩ QUANTIZING ⇩

FIG. 3C

| 45 | 0 | 4 | 0 | 0 | 0 | 0 | 0 |
|---|---|---|---|---|---|---|---|
| 0 | 13 | 0 | 0 | 0 | 0 | 0 | 0 |
| 4 | 0 | -3 | 0 | 0 | 0 | 0 | 0 |
| 0 | 0 | 0 | 1 | 0 | 0 | 0 | 0 |
| 0 | 0 | 0 | 0 | -1 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 3D

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

ACCESS ROUTE

| 0 | 1 | 2 | 3 | 4 | 5 | 6 | 7 |
|---|---|---|---|---|---|---|---|
| 15 | 14 | 13 | 12 | 11 | 10 | 9 | 8 |
| 16 | 17 | 18 | 19 | 20 | 21 | 22 | 23 |
| 31 | 30 | 29 | 28 | 27 | 26 | 25 | 24 |
| 32 | 33 | 34 | 35 | 36 | 37 | 38 | 39 |
| 47 | 46 | 45 | 44 | 43 | 42 | 41 | 40 |
| 48 | 49 | 50 | 51 | 52 | 53 | 54 | 55 |
| 63 | 62 | 61 | 60 | 59 | 58 | 57 | 56 |

ACCESS ROUTE

ACCESS ROUTE

FIG. 14A MODE 1

| 0 | 1 | 2 | 3 | 4 | 5 | 6 | 7 |
|---|---|---|---|---|---|---|---|
| 15 | 14 | 13 | 12 | 11 | 10 | 9 | 8 |
| 16 | 17 | 18 | 19 | 20 | 21 | 22 | 23 |
| 31 | 30 | 29 | 28 | 27 | 26 | 25 | 24 |
| 32 | 33 | 34 | 35 | 36 | 37 | 38 | 39 |
| 47 | 46 | 45 | 44 | 43 | 42 | 41 | 40 |
| 48 | 49 | 50 | 51 | 52 | 53 | 54 | 55 |
| 63 | 62 | 61 | 60 | 59 | 58 | 57 | 56 |

FIG. 14B MODE 2

| 0 | 15 | 16 | 31 | 32 | 47 | 48 | 63 |
|---|---|---|---|---|---|---|---|
| 1 | 14 | 17 | 30 | 33 | 46 | 49 | 62 |
| 2 | 13 | 18 | 29 | 34 | 45 | 50 | 61 |
| 3 | 12 | 19 | 28 | 35 | 44 | 51 | 60 |
| 4 | 11 | 20 | 27 | 36 | 43 | 52 | 59 |
| 5 | 10 | 21 | 26 | 37 | 42 | 53 | 58 |
| 6 | 9 | 22 | 25 | 38 | 41 | 54 | 57 |
| 7 | 8 | 23 | 24 | 39 | 40 | 55 | 56 |

FIG. 14C MODE 3-1

| 35 | 21 | 20 | 10 | 9 | 3 | 2 | 0 |
|---|---|---|---|---|---|---|---|
| 36 | 34 | 22 | 19 | 11 | 8 | 4 | 1 |
| 48 | 37 | 33 | 23 | 18 | 12 | 7 | 5 |
| 49 | 47 | 38 | 32 | 24 | 17 | 13 | 6 |
| 57 | 50 | 46 | 39 | 31 | 25 | 16 | 14 |
| 58 | 56 | 51 | 45 | 40 | 30 | 26 | 15 |
| 62 | 59 | 55 | 52 | 44 | 41 | 29 | 27 |
| 63 | 61 | 60 | 54 | 53 | 43 | 42 | 28 |

FIG. 14D MODE 3-2

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

| SHIFT QUANTITY | CODE |
|---|---|
| 0 | 0 0 |
| ±1 | 0 1<br>1 0 |
| ±2 | 1 1 0 0<br>1 1 0 1 |
| ±3 | 1 1 1 0<br>1 1 1 1 |

FIG. 16

| SHIFT QUANTITY | CODE |
|---|---|
| 0 | 0 0 |
| ±1 | 0 1<br>1 0 |
| 0 0 | 1 1 0 0 |
| ±2 | 1 1 0 1<br>1 1 1 0 |
| 0 0 0 | 1 1 1 1 0 |
| ±3 | 1 1 1 1 1 0<br>1 1 1 1 1 1 |

FIG. 17

FIG. 18A
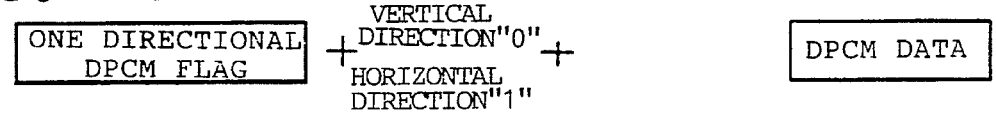
FIG. 18B
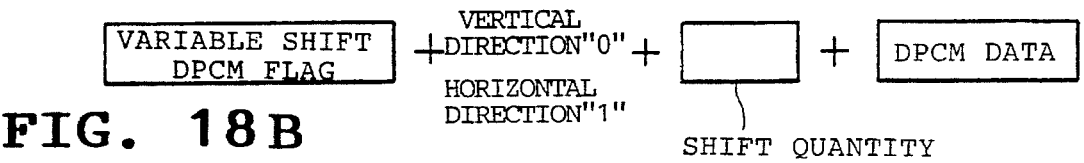
| SHIFT QUANTITY | S 0 2 | S 0 1 | S 0 0 |
|---|---|---|---|
| − 3 | 1 | 0 | 1 |
| − 2 | 1 | 1 | 0 |
| − 1 | 1 | 1 | 1 |
| 0 | 0 | 0 | 0 |
| 1 | 0 | 0 | 1 |
| 2 | 0 | 1 | 0 |
| 3 | 0 | 1 | 1 |
FIG. 22

FIG. 19A
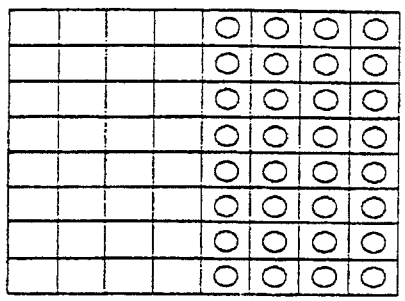
PROFILE EXISTING IN
VERTICAL DIRECTION
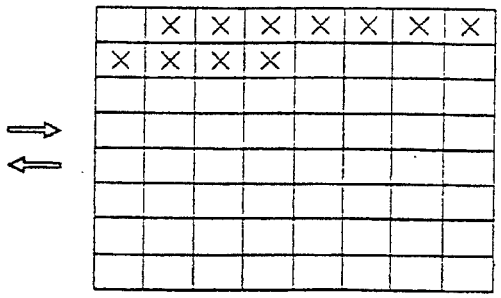
POSITION BEING DCT
COEFFICIENT OF
LARGE ENERGY
FIG. 19B
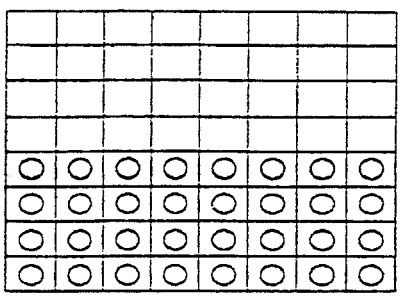
PROFILE EXISTING IN
HORIZONTAL DIRECTION
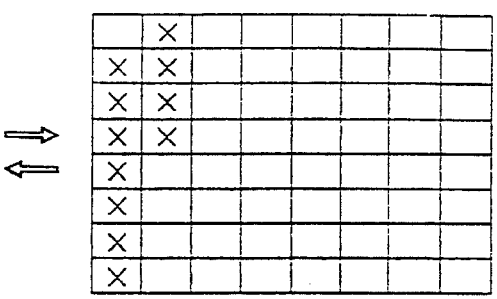
POSITION BEING DCT
COEFFICIENT OF
LARGE ENERGY
FIG. 19C
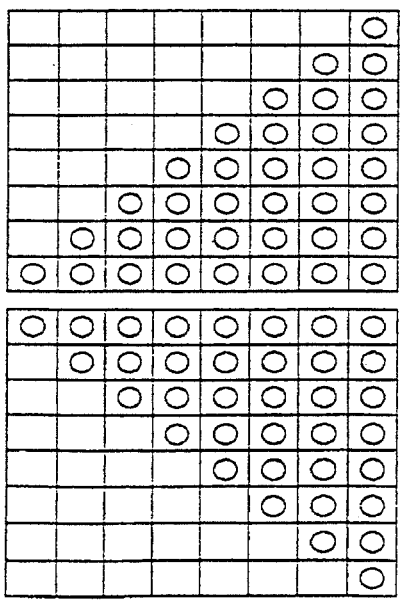
PROFILE EXISTING IN
OBLIQUE DIRECTION
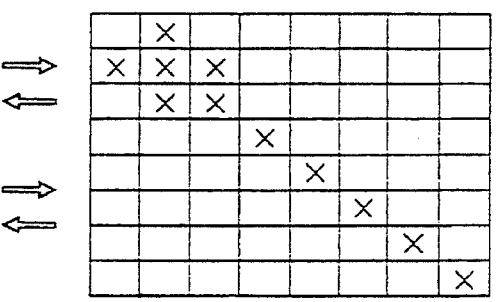
POSITION BEING DCT
COEFFICIENT OF
LARGE ENERGY

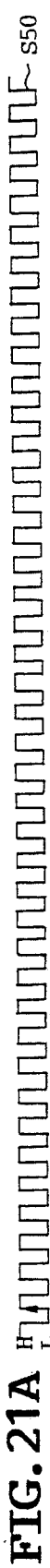
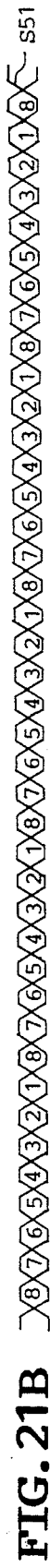
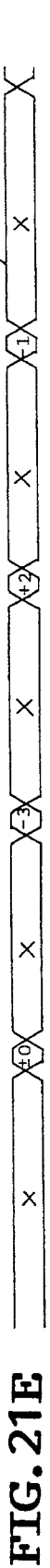
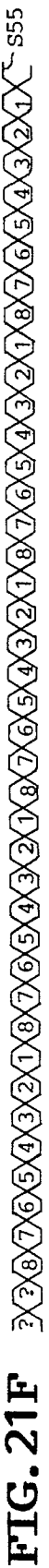
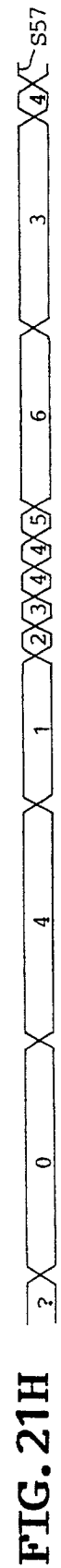
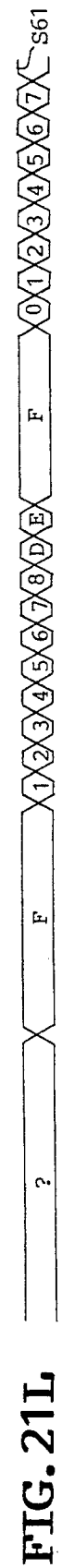

| 0 | 0 | 0 | 2 | 2 | 3 | 0 | 0 |
|---|---|---|---|---|---|---|---|
| 0 | 0 | 0 | 0 | 1 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 2 | 1 |
| 0 | 0 | 0 | 0 | 0 | 1 | 2 | 2 |
| 0 | 0 | 0 | 0 | 1 | 2 | 2 | 1 |

PICTURE ENCODING AND/OR DECODING METHOD AND APPARATUS

BACKGROUND OF THE INVENTION

1. Field of the invention

The present invention relates to a transmission system for transmitting pictures, and more particularly is suitable for an application to a motion picture encoding method for transmitting a motion picture data into which the motion picture is compression coded.

2. Description Of the Related Arts

In a video signal transmission system for transmitting a motion picture to a remote place as in the case of, e.g., a video conference system and a video telephone system, a transmission efficiency of significant information is enhanced by interframe/intraframe-coding the video signal for utilizing a transmission path at a high efficiency.

A two-dimensional discrete cosine transformation (DCT) system may be provided as a typical coding system for coding the above-described coding data at the high efficiency.

This discrete cosine transformation system is arranged such that signal power is concentrated at specific frequency components by utilizing a two-dimensional correlation possessed by the video signals, and an information quantity is compressed by coding only coefficients distributed in concentration.

For instance, the distribution of the DCT coefficients concentrates at the low frequency components at a portion where a pattern is flat, and an auto-correlation of the video signals is high. In this case, the information quantity can be compressed by coding only the coefficients distributed in concentration at the low frequencies.

On the other hand, in a pattern having a good number of edges, the ,coefficients are generated to spread widely from the low frequency components to the high frequency components at edge discontinuous points.

In this case, an extremely large number of coefficients are required for highly accurately expressing the discontinuous points of the video signals as in the edges. This results in a drop of the coding efficiency.

At this time, if quantization characteristics of the coefficients are made rough for high-compression coding of the picture, or if the coefficients of the high frequency components are omitted, a deterioration of the video signal becomes conspicuous. For example, ringing becomes visually noticeable.

In contrast, there exists a predictive coding system as a system for coding a moving picture. This predictive coding system is capable of coding the transmission picture at a relatively high efficiency with respect to the pattern having the correlations. In the case of having less correlations, there arises a problem in which the transmission efficiency declines due to an increase in the information quantity.

To solve this, proposed is an arrangement to enhance the transmission efficiency by switching the transmission picture coding system on the block unit in PCT application No. PCT/JP92/00910.

Since only redundancy of amplitude of picture signals is compressed in the predictive coding system, however, the rate of compression is lower than that in the discrete cosine transformation system in which even a spatial frequency region is compressed. It was not to obtain higher coding efficiency, therefore, only by switching between the discrete cosine transformation system and the predictive coding system.

SUMMARY OF THE INVENTION

In view of the foregoing, an object of this invention is to provide a picture encoding method wherein transmission pictures having high picture quality with less quantity of information, can be obtained by increasing the coding efficiency in a variable length coding process.

Another object of the present invention is to provide a picture encoding method wherein transmission pictures having high picture quality with small quantity of information can be obtained by increasing coding efficiency in a differential pulse code modulation (DPCM) process.

According to first aspect of the present invention, in a picture encoding method with which a picture is divided into unit blocks consisting of plural pixels, and the pixel data of said pixels is coded with either an orthogonal transformation or a predictive coding to be selected, wherein said pixel data is effected variable length coding in response to a selection.

According to second aspect of the present invention, in a picture encoding method with which a picture is divided into unit blocks consisting of plural pixels, and the pixel data of said pixels is coded with either an orthogonal transformation or a predictive coding to be selected, wherein when said pixel data is coded with the predictive coding, a difference value between first pixel data and second pixels data being surrounding second position to which said first pixel data including the unit block is moved from an initial first position, said second position being a way from the first position by a distance corresponding to the pixels of predetermined numbers.

The above and other objects, features and advantages of the present invention will be apparent in the following detailed description of preferred embodiments when read in conjunction with the accompanying drawings, in which like reference numerals are used to identify the same or similar parts in the several views.

BRIEF DESCRIPTION OF THE DRAWINGS

In the accompanying drawings:

FIGS. 3A to 3D are diagrams of assistance in explaining variations in DCT coefficient due to a discrete cosine transformation;

FIGS. 14A to 14D are diagrams of assistance in explaining a coefficient accessing route based on DPCM;

FIG. 16 is a table of assistance in explaining variable length coding;

FIG. 17 is a table of assistance in explaining variable length coding;

FIGS. 18A and 18B are schematic views of assistance in explaining DPCM coding;

FIGS. 19A to 19C are schematic views of assistance in explaining a relationship between an edge and DCT coefficients;

FIGS. 21A to 21L are timing charts of assistance in explaining a function of FIG. 20;

FIG. 22 is a table of assistance in explaining a shift quantity;

FIG. 23 is a table of assistance in explaining inter-frame difference in variable length coding; and FIGS. 24A and 24B are tables of assistance in explaining variable length coding processing according to the present invention.

DETAILED DESCRIPTION OF THE INVENTION

Preferred embodiments of this invention will be described with reference to the accompanying drawings:

Whole Construction

Figure 1:
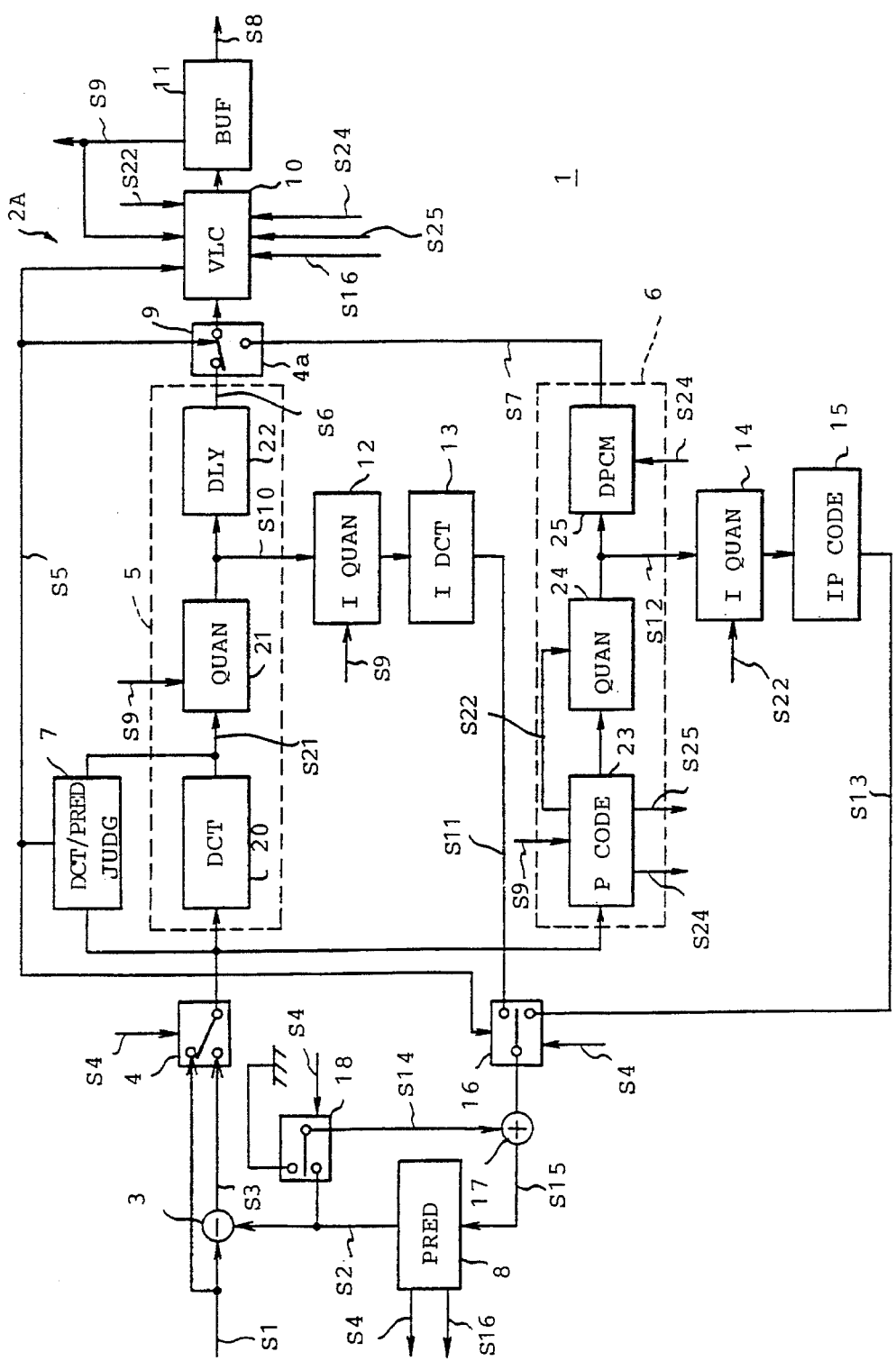
FIG. 1 is a block diagram showing one embodiment of an encoding apparatus according to the present invention.
Figure 2:
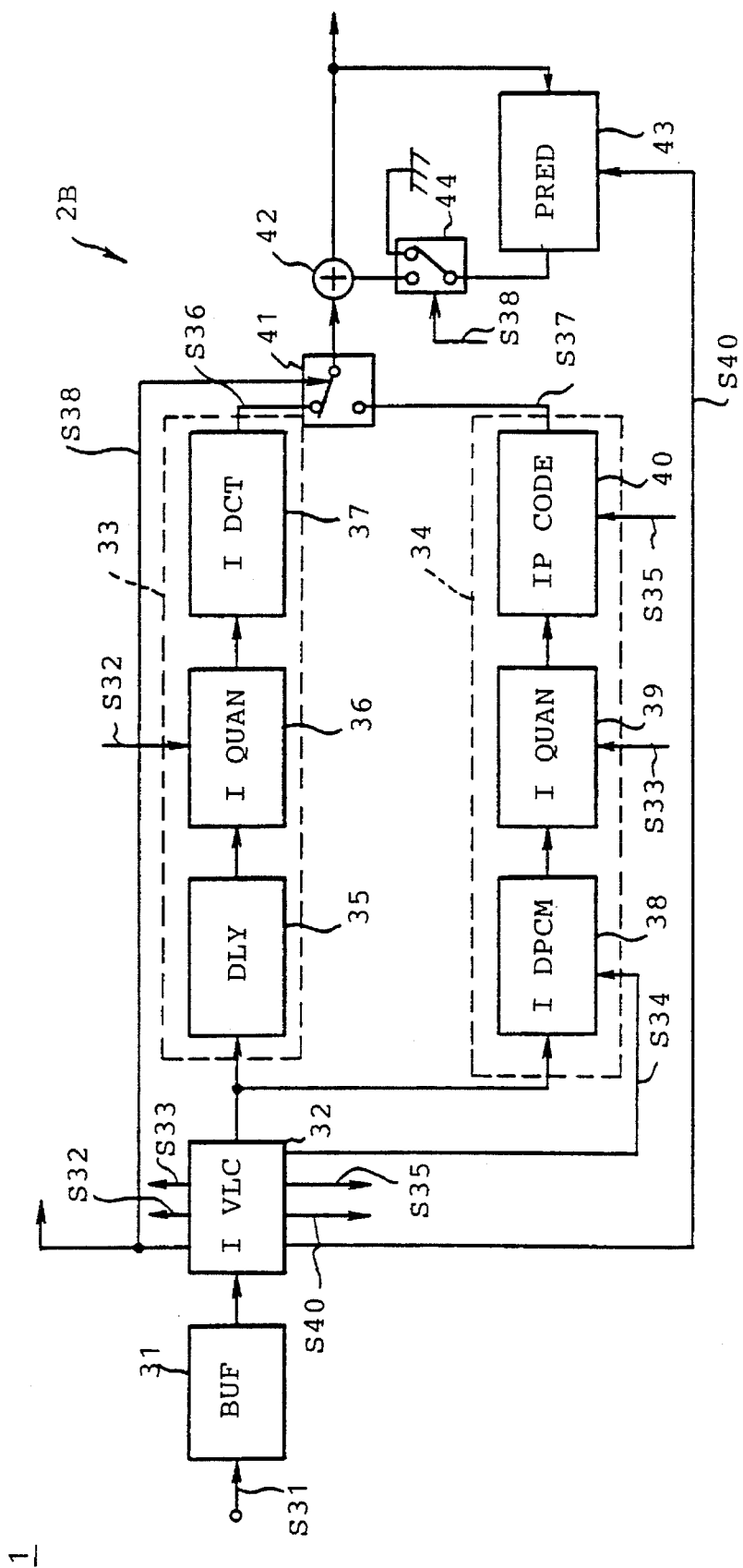
FIG. 2 is a block diagram illustrating one embodiment of a decoding apparatus according to the present invention.

Referring to FIGS. 1 and 2, the numeral 1 generally designates a picture data transmission system. An encoding apparatus 2A effects interframe (field) or interframe (field) encoding of picture data and transmits a transmission picture after being encoded while properly changing over a discrete cosine transformation process or a predictive coding process every block.

The encoding apparatus 2A adds this changeover information to a changeover information flag for the discrete cosine transformation coding or the predictive coding per region to be coded. Alternatively, the apparatus 2A provides a predictive coding mode by extending the information flag indicating a classification-by-cases of the regions to be coded.

Further, a decoding apparatus 2B decodes the transmission picture by these information flags transmitted together with the coded picture data.

Construction of Encoding Apparatus

The encoding apparatus 2A supplies, immediately when inputting the picture data of (8×8) pixels as input digital data S1, these data to a discrete cosine transformation processing unit 5, a predictive coding processing unit 6 and a discrete cosine transformation (DCT) predictive coding judging circuit 7 via a differential data generating circuit 3 and/or a switch circuit 4.

The differential data generating circuit 3 outputs, to the switch circuit 4, a difference as differential data S3 between the input digital data S1 and predictive data S2 supplied from a prediction circuit 8.

The switch circuit 4 directly output the input digital data S1 if transmissible with a less data quantity in the transmission by interframe coding in accordance with an interframe/intraframe code changeover signal S4 supplied from the prediction circuit 8. The switch circuit 4 also outputs the differential data S3 if transmissible with a less data quantity in the transmission by interframe coding.

The DCT processing unit 5 is constructed to perform a discrete cosine transformation of the input picture data S1 or the differential data S3 on a small block unit by making use of two-dimensional correlation of the input picture. The DCT processing unit 5 outputs, upon quantizing transformation data obtained as a result of this with a predetermined quantization size, this transformation data to a variable length coding circuit 10 via a switch circuit 9.

Further, the predictive code processing unit 6 effects predictive coding of an intrablock video signal to obtain a difference between a predictive value thereof and an actual video signal. A relevant differential signal is quantized with a predetermined quantization size and outputted to the variable length coding circuit 10 via the switch circuit 9.

The DCT/predictive coding judging circuit 7 judges, when coding the video signal, whether it performs the discrete cosine transformation on the block unit or the predictive coding on the block unit. The judging circuit 7 then outputs a judged result as a DCT/predictive coding switch signal S5.

In the case of outputting the discrete cosine transformation data, the switch circuit 9 thereby outputs transformation data S6 outputted from the DCT processing unit 5 to the variable length coding circuit 10. In the case of outputting the predictive coding data, the switch circuit 9 outputs predictive coding data S7 outputted from the predictive coding processing unit 6 to the variable length coding circuit 10.

Herein, the variable length coding circuit 10 includes a transforming table that is switch-controlled by the DCT/predictive coding switch signal S5 in accordance with the DCT transformation data S6 and the predictive coding data S7 which are different in terms of statistical property. A coding efficiency is further improved by the transforming table, and the data is outputted as transmission data S8.

Besides, a buffer circuit 11 outputs the transmission data S8 in the predetermined order after temporarily scoring the data in a memory and simultaneously outputs a quantization width control signal S9 for controlling the quantization size so that residual data remaining in the memory has an adequate residual quantity.

The bit streams outputted from the buffer 11 may be multiplexed with an audio signal encoded, sync signals and so on, added with code data for error correction, and recorded on a recording medium such as optical disc through a laser light after being modulated in a predetermined manner.

Herein, the encoding apparatus 2A inverse-quantizes, with a representative value, quantization data S10 supplied from the DCT processing unit 5 sequentially through an inverse quantization circuit 12 and a inverse DCT circuit 13 so as to transform the data S10 into local decoded picture data S11 by inverse transformation processing reverse to the discrete cosine transformation.

Further, the encoding apparatus 2A inverse-quantizes quantization data S12 with the representative value, the data S12 being supplied from the predictive coding processing unit 6 sequentially through an inverse quantization circuit 14 and an inverse predictive coding circuit 15 so as to transform the data S12 into decoded picture data S13 by inverse predictive coding processing reverse to the predictive coding process.

The switch circuit 16 outputs the local decoded picture data S11 when the input picture is to be discrete-cosine-transformed and transmitted, and outputs the decoded picture data S13 when the input picture is to be predictive-code-processed and transmitted, to an adder circuit 17, based on the DCT/predictive coding switch signal S5.

Herein, the adder circuit 17 adds the picture data S14 inputted from the switch circuit 18 to the decoded picture data S11 or S13 and supplies it as a local decoded data S15 to the prediction circuit 8.

Herein, the prediction circuit 8 supplies the predictive data S2 to the differential data generating circuit 3 and the switch circuit 18 on the basis of the local decode data S15. The prediction circuit 8 simultaneously outputs a motion vector/predictive mode judging signal S16 to the variable length coding circuit 10 in accordance with the local decode data S15.

Construction of DCT Processing Unit 5

The DCT processing unit 5 includes a discrete cosine transformation (DCT) circuit 20, a quantization circuit 21 and a delay circuit 22. The DCT circuit 20 discrete cosine transforms the input digital data S1 or the differential data S3 into discrete cosine coefficient data S21 by making use of a two-dimensional correlation of the input picture and the outputs the data to the quantization circuit 21 (referring to "Interframe/Intraframe Adaptive Extrapolation Interpolation Predictive Encoding of HDTV Signal", pp. 96–104, Vol. J70-B No. 1, 1987/1, Article Magazine by Association of Electronic Information Communications and Japanese Patent Application No. 410247/1990).

Besides, the quantization circuit 21 quantizes the discrete cosine coefficient data S21 in accordance with a generated information quantity and outputs the quantization data S10 to the delay circuit 22 and the inverse quantization circuit 12 as well.

The delay circuit 22 outputs the quantization data S10 to the variable length coding circuit 10 by delaying the data S10 for a delay time corresponding to a processing time of the predictive coding processing unit 6.

In this connection, the DCT system, it is generally known, exhibits such a property that large values concentrate at the vicinity of a certain coefficient when discrete cosine transforming a signal having a smooth variation in luminance.

For instance, as illustrated in FIG. 3A, there is provided a pattern including edges in the direction from a left upper side to a right lower side as one block consisting of (8×8) pixels. When inputting an original picture in which each pixels has a luminance level from 30 to 100, a DCT circuit 40 executes the discrete cosine transformation, with the result that the majority of coefficients in the block become 0 (FIG. 3B). Further, the coefficients having values exists on a diagonal line from the left upper side to the right lower side.

Next, when the quantization circuit 21 quantizes these coefficients with a value, e.g., 10 of luminance level, almost of the coefficients become 0, and only the large coefficients remain.

Then, those coefficients are sequentially accessed in accordance with an illustrated coefficient access route (numeral indicates the accessing order). Encoding is effected by the variable length coding circuit (VLC) 10 in the variable length coding system of Huffman Code or the like, whereby high-efficiency coding is attainable.

On this occasion, in view of the fact that the pixels have the correlation in the two-dimensional directions, there is proposed accessing of remote coefficients gradually from a coefficient access starting point.

Besides, in such a pattern that the correlation of the coefficients is strong in the horizontal direction, the coefficients of the upper stage (0 to 7) of the block are sequentially accessed in the accessing order shown in FIG. 4, and subsequently the coefficients (8 to 63) can be accessed.

Processing of Predictive Encoding Processing Unit
6

The predictive coding processing unit 6 includes a predictive coding circuit 23, a quantizing circuit 24 and a DPCM (Differential Pulse Code Modulation) circuit 25.

The predictive coding processing unit 6 predictive-codes the video signal in a block. Then, a differential signal of that block is generated from the video signal information in the block and the quantized. An auto-correlation remaining in the differential signal is reduced by the DPCM circuit 25, and this data is coded by the variable length coding circuit 10, whereby the high-efficiency coding is attainable (Japanese Patent Laid-Open Publication Nos. 135281/1989 and 134910/1990).

On this occasion, the buffer circuit 11 monitors the output data and determines a quantization width Q of the predictive coding circuit 23 in accordance with an information quantity.

An adaptive quantizing method may involve the use of the following three concrete methods. According to the present invention., one or a plurality of these methods are selectively usable every block.

Method of Setting Mean Value of Picture Signal in
a Block as Predictive Value

Figure 5:
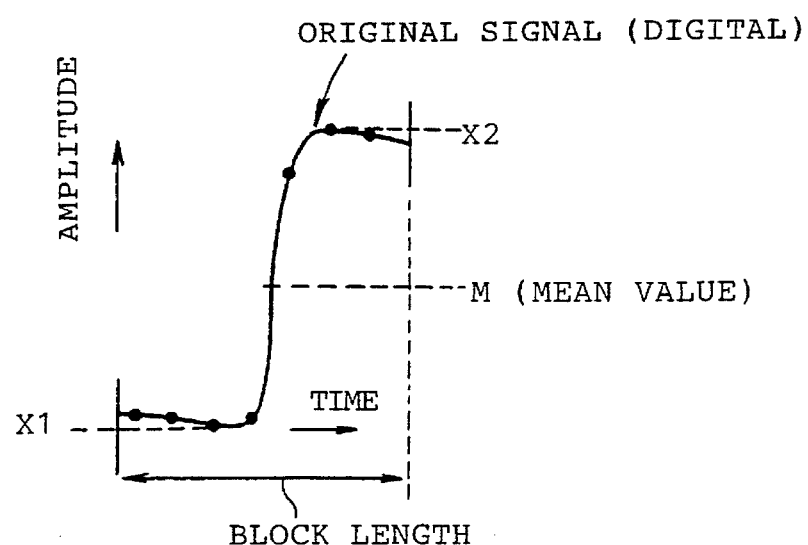
FIG. 5 is a diagram showing a characteristic curve of assistance in explaining a prediction of a mean value.

Namely, the method comprises the steps of obtaining, as illustrated in FIG. 5, a mean value of amplitudes of all the pixels within the block and quantizing a difference between the mean value and a signal level of each pixel. The quantization width Q is herein a value outputted from the buffer circuit 11.

At this moment, let M be the mean value in the block, and let L be the signal level of the pixels in the block pixel. The quantization code Lq is expressed by the following formula.

$$Lq=(L-M)//Q \qquad (1)$$

where // indicates round-off of one tenth's place.

Figure 6:
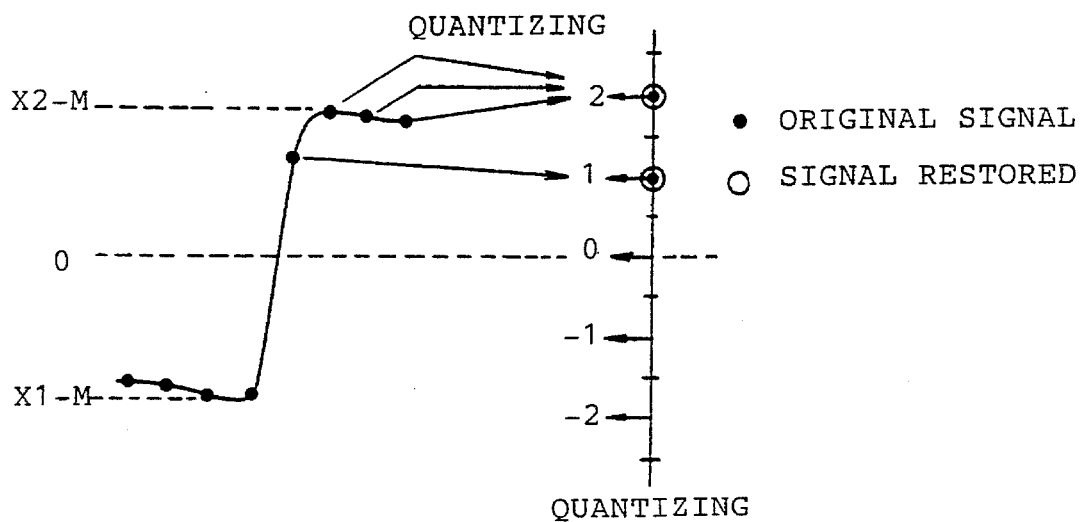
FIG. 6 is a diagram showing a characteristic curve of assistance in explaining quantization/decoding characteristics based on the prediction of the mean value.

Further, let L' be the restored value, the expression can be given by (FIG. 6):

$$L'=Lq*Q+M \qquad (2)$$

Figure 7:
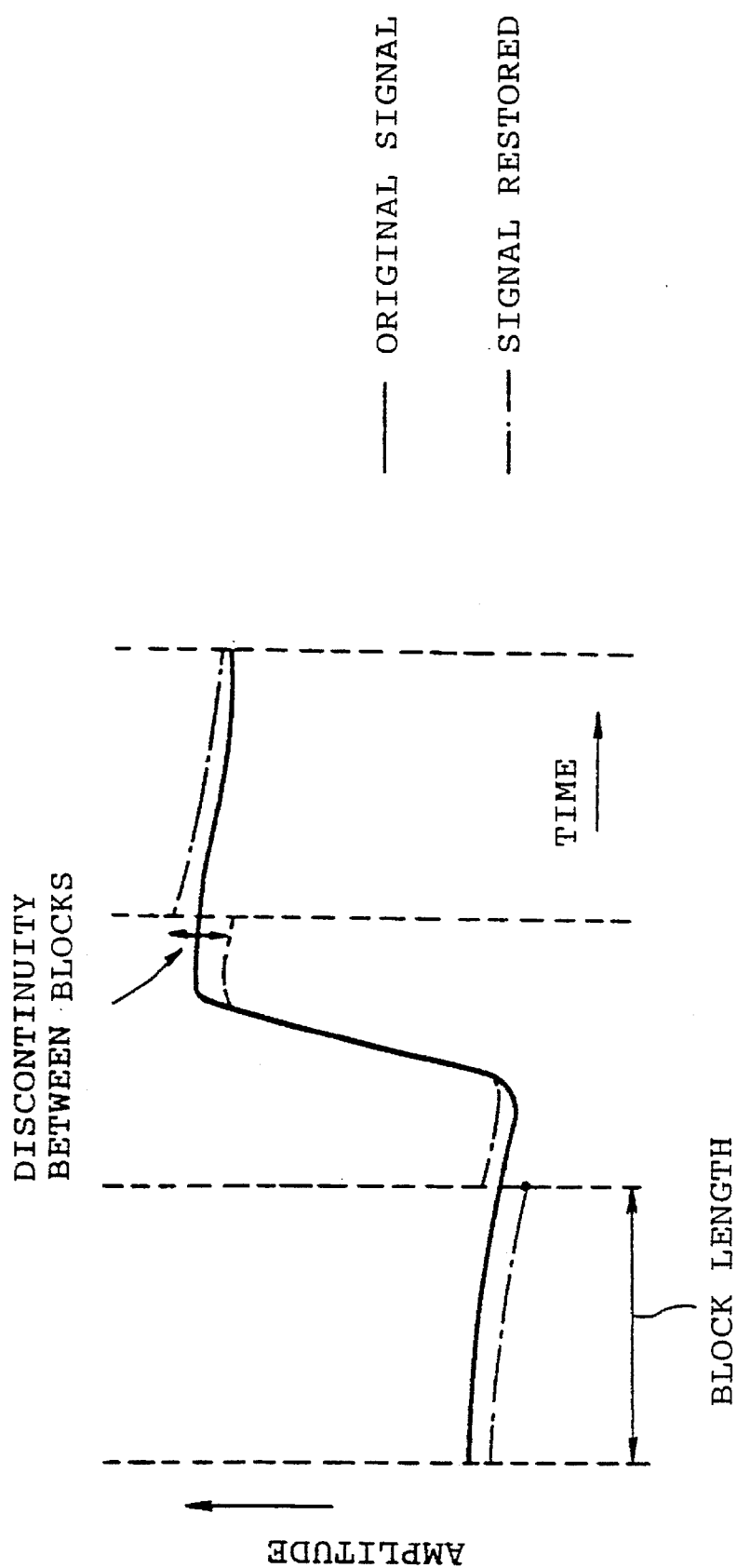
FIG. 7 is a diagram showing a characteristic curve of assistance in explaining a block distortion when utilizing the prediction of the mean value.

However, if the quantization width Q is large in this system, a distortion of the restored value increases, and it follows that, as shown in FIG. 7, a discontinuity tends to appear between the blocks.

Method of Obtaining Predictive Value by Use of ADRC (Adaptive Dynamic Range Coding)

This method is disclosed in a material "(4–3) of The 4th Picture Coding System (PSCJ), 1989, titled "Examination of Quantization System of Adaptive Dynamic Range Coding", by Kondo and others.

Figure 8:
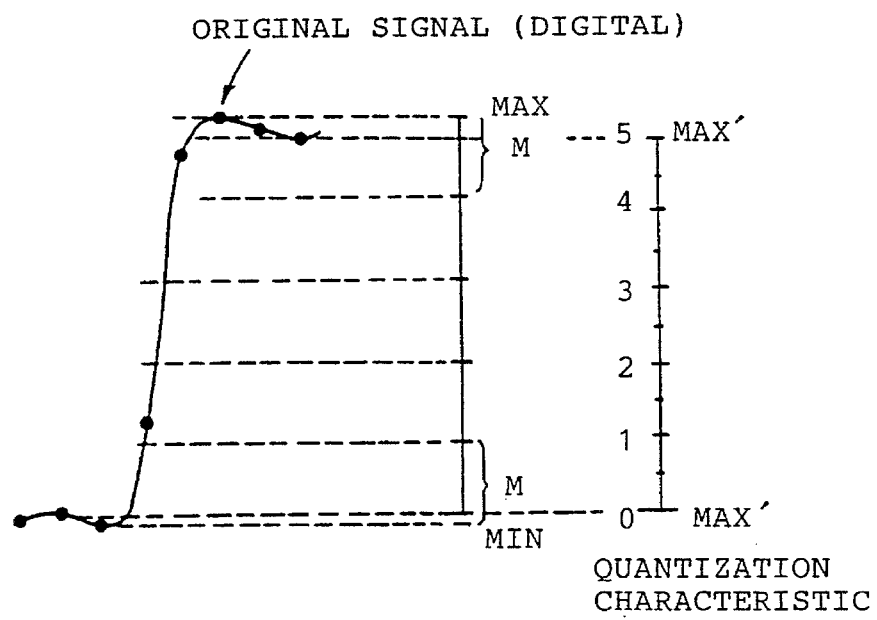
FIG. 8 is a diagram showing a characteristic curve of the quantization characteristic based on adaptive dynamic range coding.
Figure 9:
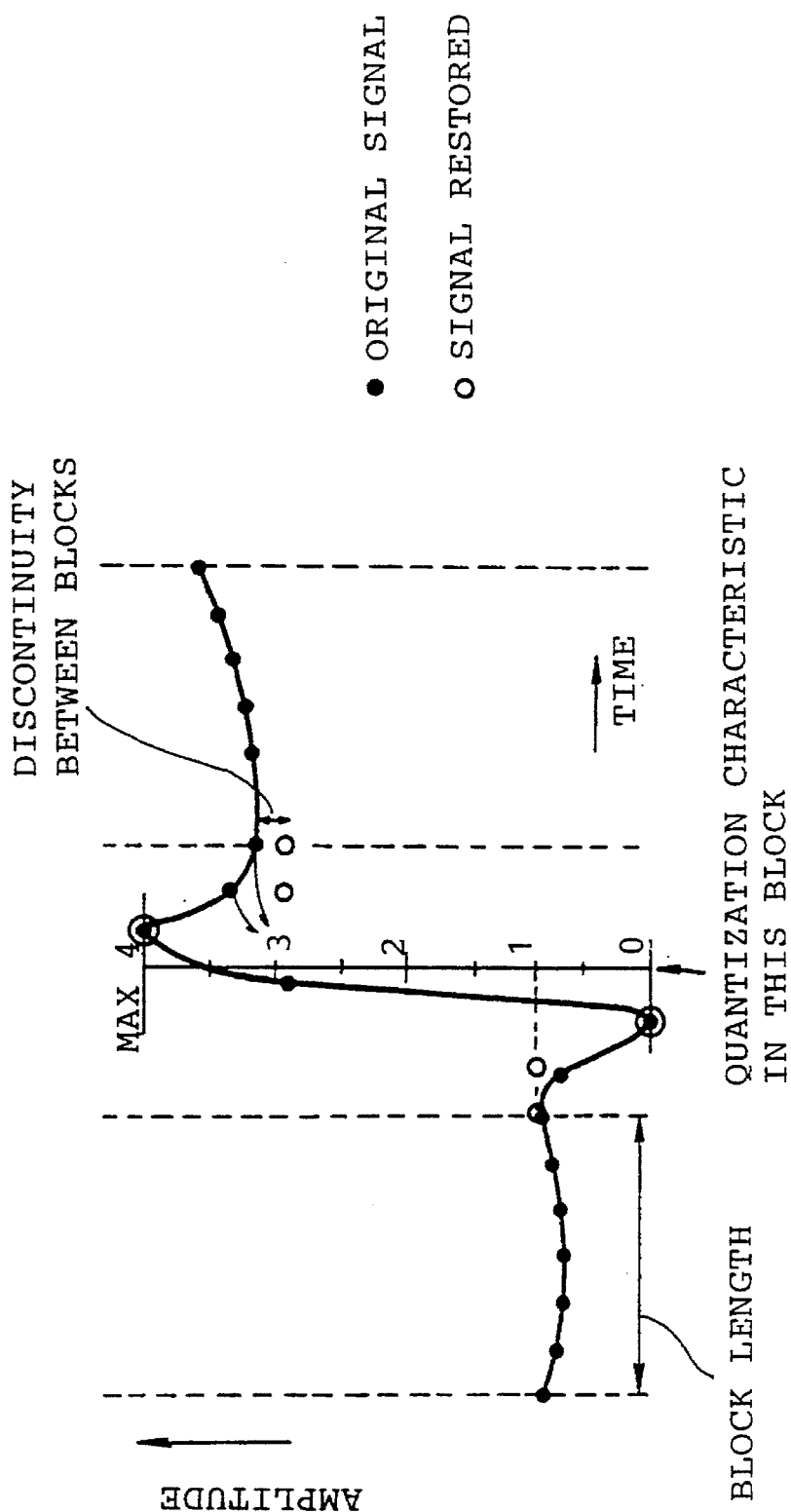
FIG. 9 is a diagram showing a characteristic curve of assistance in explaining the block distortion when utilizing the adaptive dynamic range coding.

FIG. 8 illustrates quantization characteristics in the case of applying the adaptive dynamic range coding (ADRC). FIG. 9 shows an example of the block distortion caused by the adaptive dynamic range coding. In the adaptive dynamic range coding, the reason why a minimum value in the block is used as a predictive value is that the minimum value exists in the peripheral portion To that block in many cases.

More specifically, the block is typically a region as small as (8×8) pixels. Hence, the luminance level is very low in the case of a recessed shape. For this reason, the minimum value of a certain block often takes a value approximate to the minimum value of any of the peripheral blocks.

Therefore, if the minimum value exists in the peripheral portion to the block, the continuity with respect to at least one peripheral block is kept, thereby restraining the block distortion down to the least.

Further, in the adaptive dynamic range coding, as shown in FIG. 8, the maximum and minimum values are newly defined based on the mean value of the signal values contained in the high-order and low-order gradation levels. It is therefore difficult to undergo influences of noises and isolated point (Japanese Patent Laid-Open Publication No. 134910/1990).

Edge Matching Quantizing Method (1)

Figure 10:
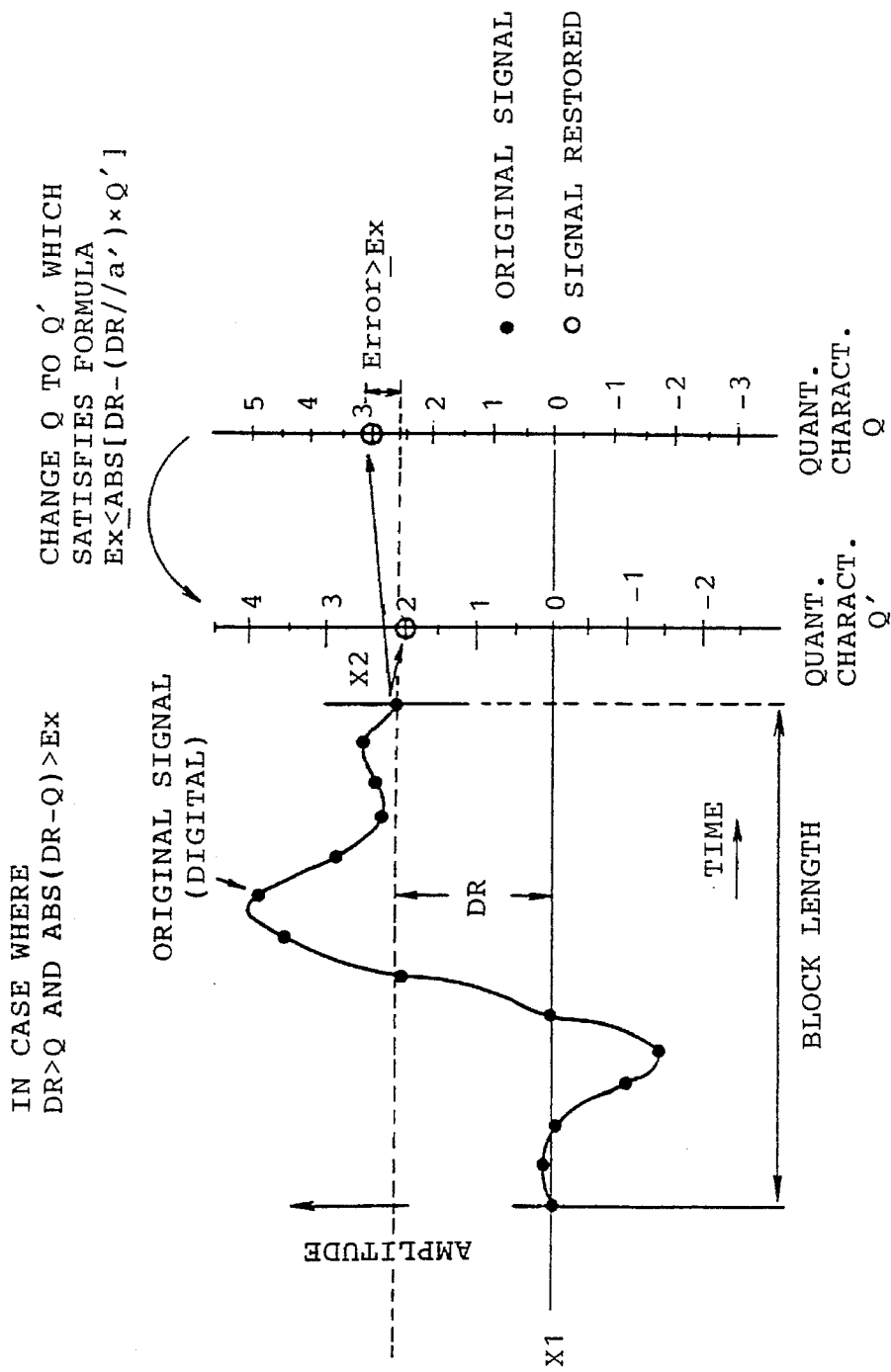
FIG. 10 is a diagram showing a characteristic curve of assistance in explaining an edge matching quantizing method (1).
Figure 11:
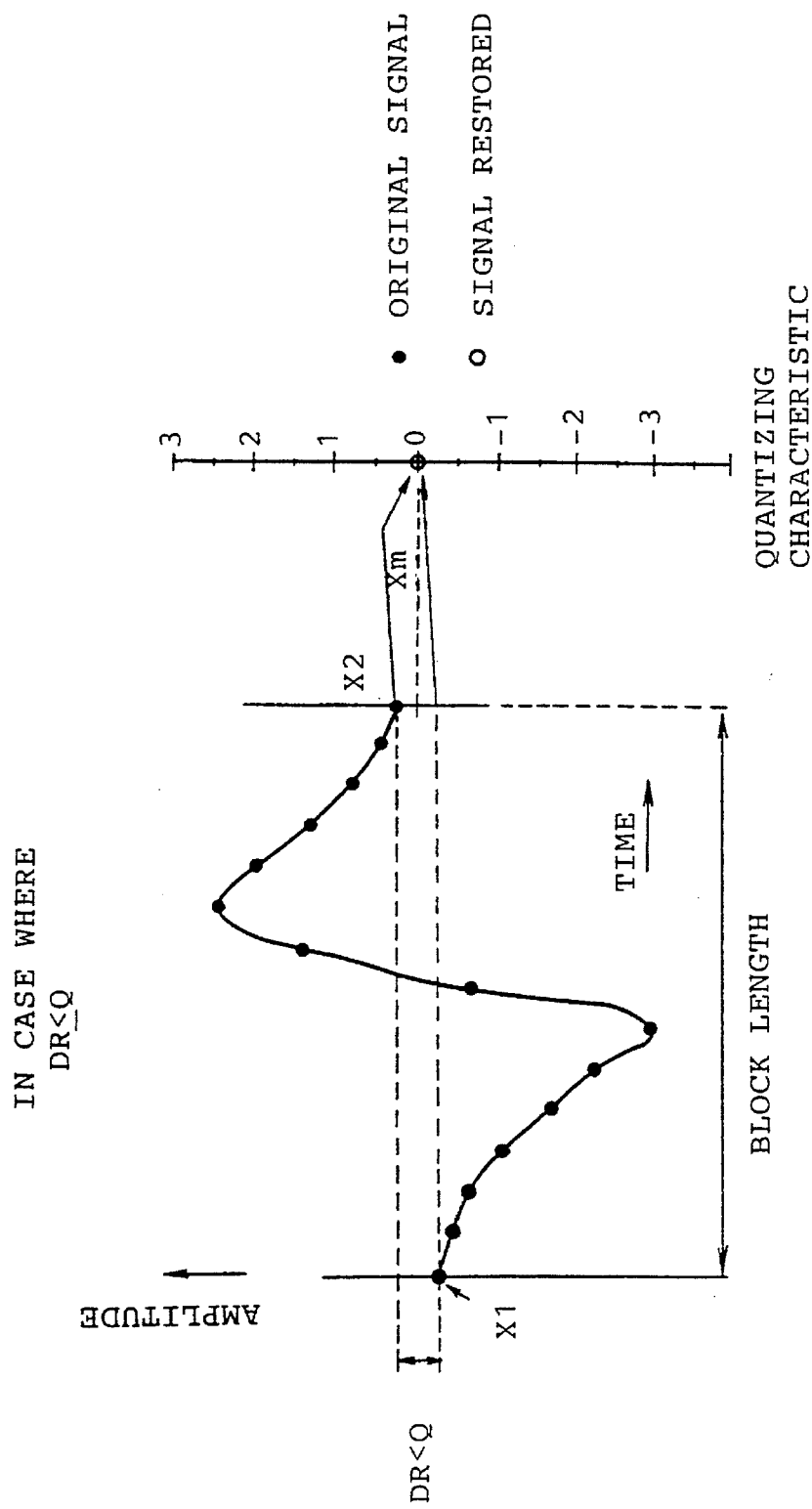
FIG. 11 is a diagram showing a characteristic curve of assistance in explaining the quantizing characteristic based on the edge matching quantizing method (1)

To start with, the one-dimensional case will be explained. Let X1 and X2 be the signal values at both ends of the block with respect to block length signals illustrated in FIGS. 10 and 11. For simplicity, a relation width Q outputted from the buffer 11 is changed by the following algorithm so that the restored values of the signal values X1 and X2 are outputted under a predetermined error.

Let L be the signal level of the pixel in the block and Ex be the restored value allowable error of the signal values X1 and X2. The dynamic range DR is expressed by:

$$DR=X2-X1 \qquad (3)$$

The quantization width Q and the signal values are given by:

$$DR>Q \qquad (4)$$

$$ABS (DR-Q)>Ex \qquad (5)$$

The quantization width Q is equalized to a quantization width q designated by a quantization width control signal S22 outputted from the predictive coding circuit 23 to the quantizing circuit 24, while the signal X1 remains as it is. Further, $$DR>Q \qquad (6)$$

and $$ABS (DR-Q)<Ex \qquad (7)$$

where the quantization width Q and the signal value X1 remain as they are, and ABS is the absolute value. Herein, $$DR<Q \qquad (8)$$

The quantization width Q remains as it is. When the mean value of the signal values X1 and X2 is expressed such as Xm=(X1+X2)//2, the signal value X1 is set to Xm.

Obtained, however, as the quantization width q designated by the predictive coding circuit 23 is a value greater than Q which satisfies:

$$Ex<ABS (DR-(DR//q) * q) \qquad (9)$$

with respect to all sets of quantization widths Q and the dynamic ranges DR. A table is written to ROM.

At this time, the quantization code Lq is given by:

$$Lq=(L-X1)//Q \qquad (10)$$

Further, the restored value L' is given by:

$$L'=Lq*Q+X1 \qquad (11)$$

In this system, an error in restoring signals at both ends of the block is restrained by Ex, and therefore the continuity in the block can be further held.

Next, the two-dimensional case will be described.

When extending the one-dimensional method to a two-dimensional block, a subroutine for determining X1 and X2 is required. An algorithm for this determination takes the following procedures.

Figure 12:
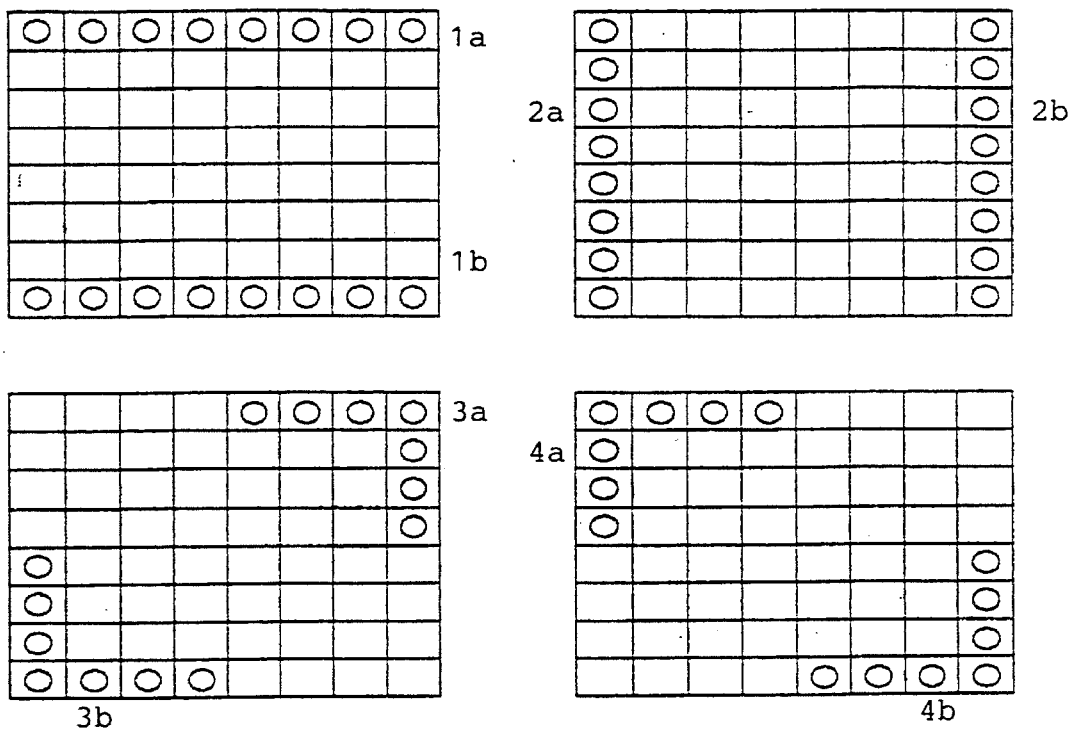
FIG. 12 is a diagram illustrating regions in a case where the edge matching quantizing method (1) is applied to two-dimensional coding.

To start with, as illustrated in FIG. 12, block end regions 1a and 1b, 2a and 2b, 3a and 3b, 4a and 4b are considered with respect to the two-dimensional block signals of (8×8) pixels.

Subsequently, mean values of pixel values in a region are obtained on the respective regions. Herein, the mean values thereof are expressed by m1a and m1b, m2a and m2b, m3a and m3b, m4a and m4b.

Obtained thereafter is the maximum among ABS (m1a −m1b), ABS (m2a−m2B), ABS (m3a−m3b) and ABS (m4a−m4b).

Obtained with the above-described procedures is a direction in which the pixel values become different largely at the both ends of th block, i.e., an edge transverse direction. Hence, the smaller of the representative pixel values in the selected two regions is set as X1, and the other is set as X2. The block signals are quantized and inverse-quantized in the same way with the one-dimensional case.

Edge Matching Quantizing Method (2)

Firstly, the one-dimensional case will be explained.

Figure 13:
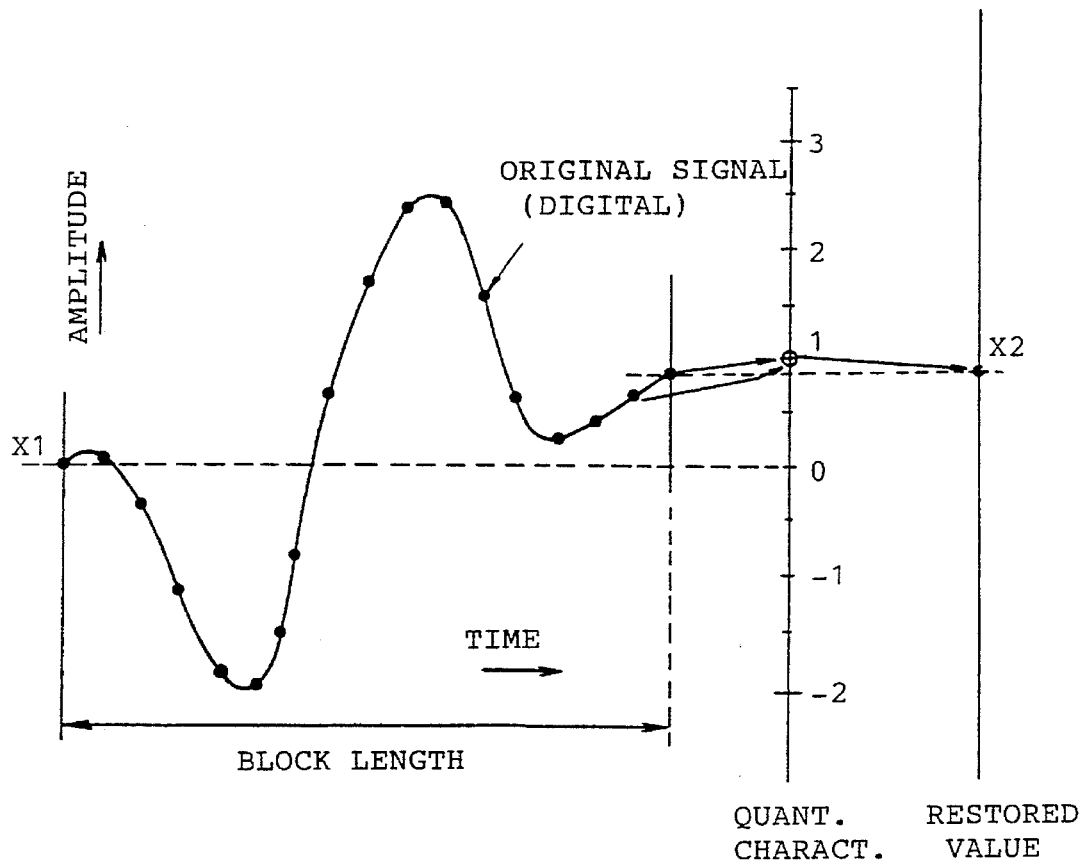
FIG. 13 is a diagram showing a characteristic curve of assistance in explaining an edge matching quantizing method (2)

Let X1 and X2 be the signal values at both ends of the block on the block length signal shown in FIG. 13. For simplicity, X1<X2.

This method is characterized by effecting a modification of the restored values on the side of the decoder so that the signal values X1 and X2 are outputted directly as the restored values. Let L be the signal level of the pixels in a block, and let Q be the quantization width outputted from the buffer 11. The quantization code Lq is given by:

$$Lq=(L-X1)//Q \tag{12}$$

The encoding apparatus 2A herein transmits the signal values X1 and X2 and the quantization width Q as quantization parameters in addition to the quantization code Lq. Further, the decoding apparatus 2B receives the signal values X1 and X2 and the quantization width Q as the quantization parameters. A quantization value X2q of the signal value X2 is at first calculated.

$$X2q=(X2-X1)//Q \tag{13}$$

Hereafter, if the quantization code Lq is equal to the quantization value X2q, there is given:

$$L'=X2 \tag{14}$$

If not equal, there is given:

$$L'=Lq*Q+X1 \tag{15}$$

They are thus restored to the restored value L'.

This method is simpler in algorithm than by the edge matching quantizing method (1) but does not require a ROM table for changing the quantization width Q.

Next, the two-dimensional case will be explained.

When extending the edge matching quantizing method (2) to the two-dimensional block signals, X1 and X2 are determined by the method described in the item of the foregoing edge matching quantizing method (1). The quantization after this and the decoding method are effected in the same way with the one-dimensional case.

Processing of DPCM (Differential PCM) Circuit 25

The auto-correlation of the signal possessed by the original video signal remains almost as it is in the coefficient after the adaptive quantization. Hence, the information quantity can be further compressed by performing DPCM at a posterior stage thereof.

Herein a scan direction of the input pixel is designated by a scan signal S24 from the predictive coding circuit 23 in the DPCM circuit 25.

The DPCM circuit 25 takes a difference between an after-quantization video signal Yi inputted from a differential unit and a pixel value positioned before one pixel, thereby acquiring:

$$Ei=Yi-Y(i-1) \tag{16}$$

A predictive error signal Ei is allowed to take values from −255 to +255 on the assumption that the input signal consists of 8 bits. Hence, if the signal is transmitted in the as-is form, this needs 9 bits, and a 1-bit extra code is required per pixel.

It is, however, known that the majority of predictive error signals concentrate in the vicinity of zero. Therefore, all the signals are expressed by 9 bits, and instead, short bit length codes are allocated to a multiplicity of signal values which appear, whereby the block signals can be expressed by much shorter bit lengths than, as a matter of course, the 9-bit input signals and also the original 8-bit input signals on the average as a whole of the block.

Herein, the following three methods are usable as a method dutiable for DPCM in a block. According to the present invention, one of the following methods is selectively employed per block.

DPCM Method (1)

Figure 4:
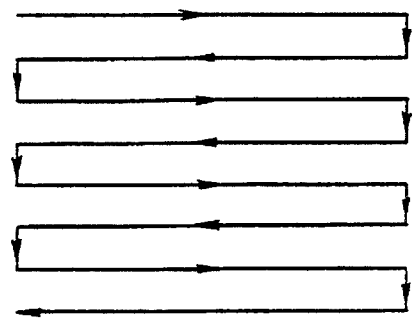
FIG. 4 is a diagram of assistance in explaining an accessing order of the coefficients.

DPCM of the block signals after the adaptive quantization is executed on an accessing route shown in FIG. 4. The accessing route is provided in only one way, and therefore the circuitry may be simple. However, the compression of a large information quantity can not be expected in blocks (a mode 2 of FIG. 14B, a mode 3-1 of FIG. 14C, a mode 3-2 of FIG. 14D) other than the block including a profile as shown in the mode 1 of FIG. 14A.

DPCM Method (2)

Then, some consideration is Given to a switchover of the data accessing method to effect the compression of an optimum information quantity in the respective modes 1 through 3-2. FIGS. 14A to 14D demonstrate the accessing methods suitable for the modes 1 through 3-2.

Next, a method of judging a switchover of these modes of DPCM. This judgment is made by imparting, to the DPCM circuit 25, the information obtained from an examination of a profile directivity of a signal in a block explained in the edge matching quantizing method (1)

Namely, it corresponds respectively to the mode 1 when i=1, the mode 2 when i=2, the mode 3-1 when i= 3 and the mode 3-2 when i=4.

DPCM Method (3)

This method is a method utilizing such a characteristic that a large proportion of DPCM objects are blocks including the edges.

Figure 15:
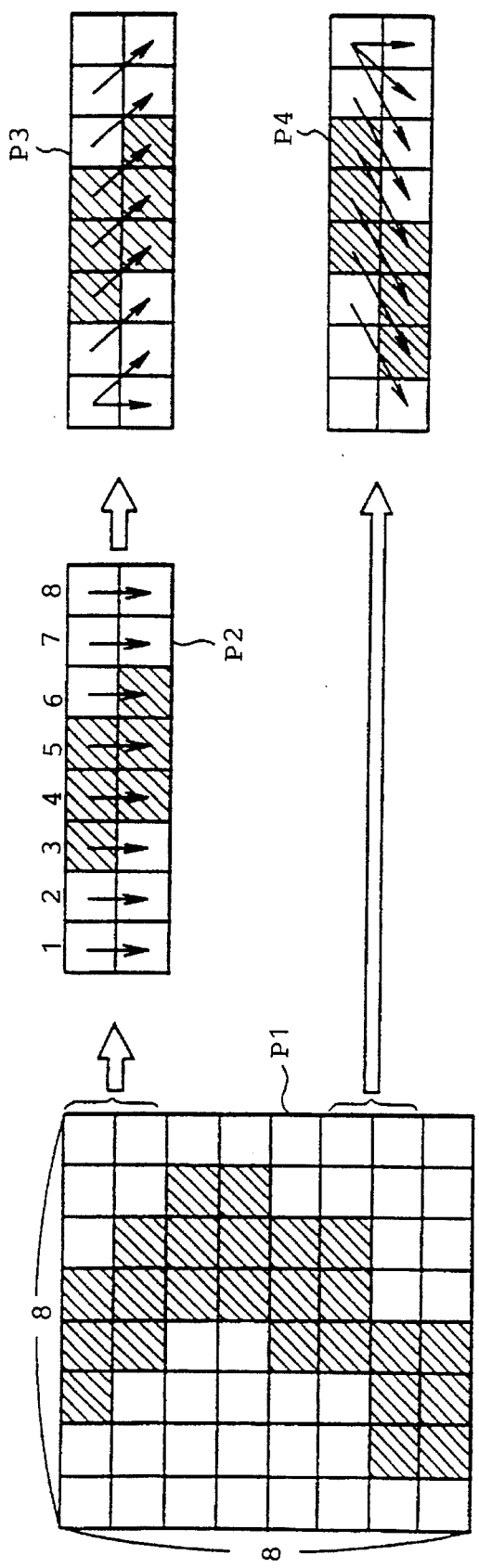
FIG. 15 is a schematic view of assistance in explaining variable shift DPCM processing.
Figure 20:
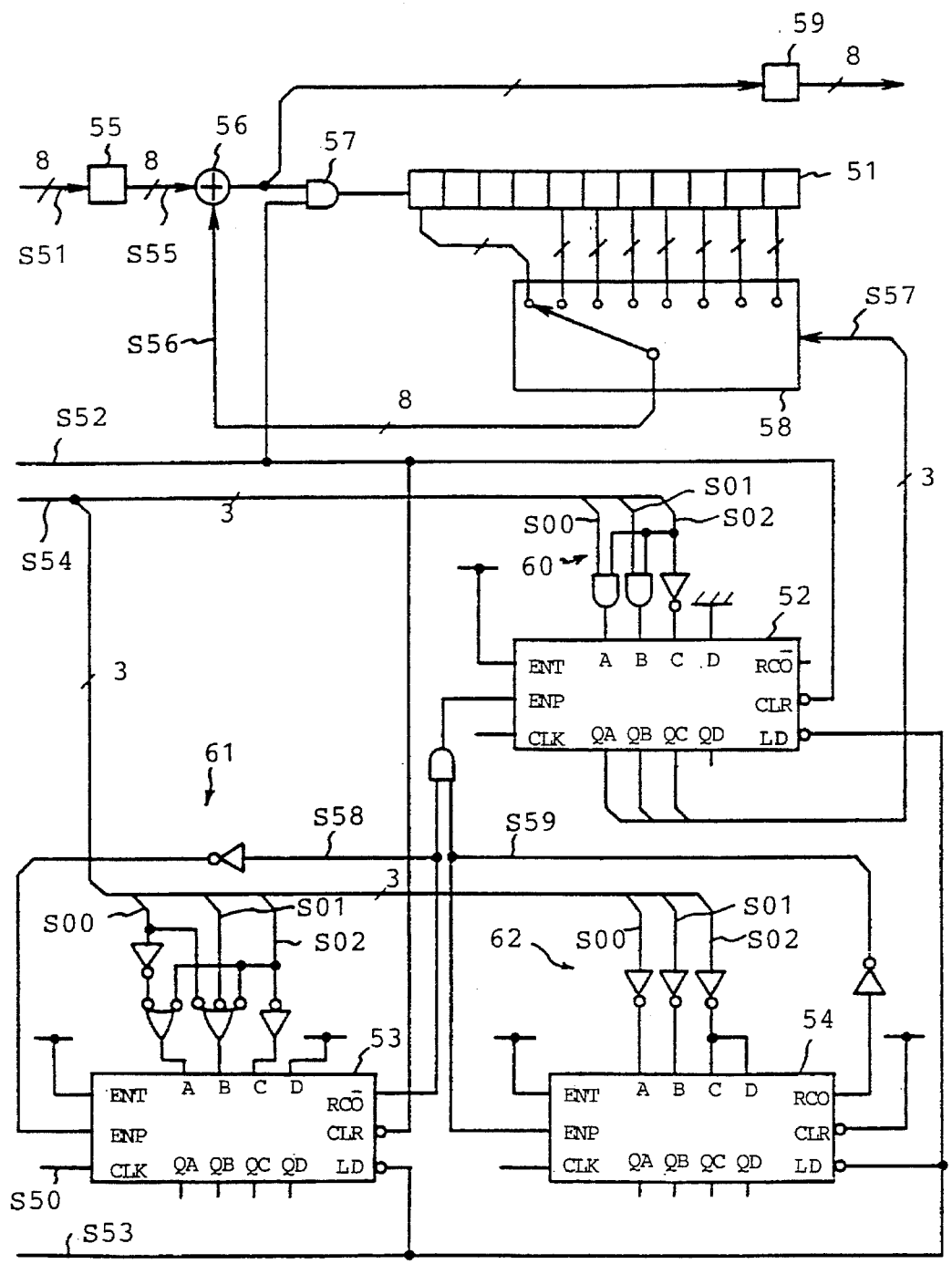
FIG. 20 is a connection diagram showing a variable shift DPCM decoder.

If a certain block contains an edge, this implies that discontinuous points are arranged in any one of vertical, horizontal and oblique directions in that block. As a matter of course, the discontinuous points are not necessarily arranged on a straight line. They are arranged as shown in, i.g., FIG. 15 with oblique lines.

Even if those blocks are coded by the DPCM method (1) or (2), the edge characteristic does not coincide with the scan direction. The differential value increases, therefore, resulting in a drop of the coding efficiency.

To obviate this problem, a difference is taken by the following algorithm. For giving a concrete explanation, a size of the lo lo lo lock is set to (8×8) pixels, as shown as data P1, and DPCM is effected in the vertical direction. In fact, however, the block may take any size, and the DPCM direction may be horizontal.

Namely, DPCM is performed per pixel with respect to the first row, thereby taking a difference.

DPCM is executed en bloc in the vertical direction for the horizontal 8 pixels, i.e., per row with respect to the second and subsequent rows.

At this moment, as depicted as data P4, if the difference is taken directly in the vertical direction, the differential value increases at the 3rd and 6th pixels. To avoid this, as shown as data P3, if the difference is taken after the first row has been shifted one pixel to the right hand, a large difference is not produced.

The problem at this time may be the pixels at both ends of the block. However, as illustrated as data P4, when shifted two pixels to the left hand, the 1st and 2nd pixels are not used for prediction. Instead, differences between 6th, 7th and 8th pixels of the next row are taken by use of the 8th pixel. This is a so-called arithmetical shift.

as explained above, the shift quantity is variable per row, and this system is therefore referred to as variable shift DPCM. If this variable shift DPCM is employed, the high-efficiency coding is attainable even in the blocks containing more complicated edges than in data P1.

Further, not only the integer shift quantity on the pixel unit but also a shift quantity of decimal points or under can be considered as a shift quantity of variable shift DPCM. The shift of the decimal points or under corresponds to an interpolation of an interpixel value by use of an interpolating filter. For instance, a 0.5-pixel shift is to obtain a mid-point value between the pixels.

Herein, a DPCM circuit 45 has to, in the case of coding by suing variable shift DPCM, transmit the shift quantity of each row (column) in addition to the differential value. For example, when the shift quantity per row (column) is set to ±3 pixels, it is feasible to correspond to the majority of edges. Hence, if the shift quantity is set within several kinds of ranges of −3 through +3, 3 bits are needed. In this case, in the block of (8×8) pixels, as shown in the following formula, $$3 \text{ bit} \times 7 \text{ shift} = 21 \text{ bit} \quad (17)$$

added information of 21 bits is required.

When further obtaining a generation probability of the shift quantity which is used in the actual picture, the added information quantity can be reduced by the variable length coding. If the generation probability of the shift quantity of, e.g., ±2 pixels or above is small, as shown by:

$$2 \text{ bit} \times 7 \text{ shift} = 14 \text{ bit} \quad (18)$$

the added information quantity can be reduced down approximately to the vicinity of 14 bits on the average by use of the codes of FIG. 16.

Besides, the shift quantities from the 1st row to the 7th row have correlations with each other. For instance, the edge is a vertical or horizontal or oblique straight line, the shift quantities from the 1st row to the 7th row are the same. For this reason, there exists a method of effecting the coding en bloc by arranging the shift quantities from the 1st row to the 7th row.

In this case, if the generation probability of a shift quantity 0 is particularly large, and when the row of the shift quantity 0 continues, it can be grasped as a zero run length. The added information quantity can be also reduced by employing the codes shown in FIG. 17 including the zero run length.

Such differential information and shift quantities can be, as illustrated in FIG. 18B, multiplexed and transmitted.

Processing of DCT/Predictive Encode Judging Circuit 7

The DCT/predictive code judging circuit 7 of FIG. 1 judges, when coding the video signal, which process to execute on the block unit, DCT or predictive coding. At the first onset, the circuit 7 has to judge which processing method to select from the block information. In that case, the judgment is made in a spatial region or a DCT transformation output region. The respective judging methods will hereinafter be described in detail.

Judging in Spatial Region

A dynamic range (from maximum value to minimum value) of the video signals in a block tales is a large value in such a pattern that the luminance abruptly changes, concretely in a picture containing edges and detail portions. In this kind of pattern, DCT is disadvantageous in terms of a compression rate of the information predictive coding should be selected. Therefore, a dynamic range (DR) in a block is obtained per block. It is judged that predictive coding is executed with respect to the blocks in which the value thereof exceeds a proper threshold value (A) selected from the compression rate and a deterioration of pattern.

Judgment in DCT Transform Output Region

It is known that the DCT coefficients exhibit the following property in a case where the picture signal undergoes two-dimensional DCT. For instance, in two-dimensional DCT where the block (macro block) consists of (8×8) pixels, a coefficient F (0, 0) in the 0th row and 0th column corresponding to the left upper corner of the block corresponds to a DC component indicating a mean luminance within the picture block. Then, with a shift from F (0, 0) in the right horizontal direction, the coefficients indicate vertical high frequency components within the picture block and indicate, with a shift in the lower direction, horizontal high frequency components.

Namely, when discrete-cosine-transforming the block having the pattern where the luminance abruptly changes as in the case of an edge, its transformation output is, as shown in FIGS. 19A to 19C, roughly classified into the following three types. FIGS. 19A to 19C illustrate output regions after the discrete cosine transformation in the (8×8) pixel macro block.

The mark 0 herein indicates a position of a high (or low) pixel, while the mark X indicates a position in which a large DCT coefficient tends to generate in the block.

FIG. 19A shows a case where the profile exists in the vertical direction. The DCT coefficients concentrate with a large energy in the horizontal direction from the low order. This is hereafter called a "case 1". Further, FIG. 19B illustrates a case in which the profile exists in the horizontal direction. The DCT coefficients concentrate with a large energy in the vertical direction of the low order. This is hereafter called a "case 2".

FIG. 19C shows a case in which the profile exists in the oblique direction. The DCT coefficients concentrate with a large energy in the oblique direction from the low order. This is hereafter called a "case 3".

Obtained per block are an absolute value sum Fa of all the DCT coefficients exclusive of the DC components and absolute value sums F1, F2, F3 of the DCT coefficients of regions respectively indicated by X in the DCT output regions in the cases 1, 2 and 3.

Then, where Fmax is the maximum among the absolute value sums F1, F2 and F3, coding is effected by the predictive coding system with respect to the blocks in which a ratio of Fmax to Fa exceeds a proper threshold value selected from the compression rate and the deterioration of the pattern.

Construction of VLC Circuit 10 VCL (Variable Length Coding) Method (1)

Coding tables used for variable length coding are provided, because statistical properties of signals discrete cosine transformed and predictive coded are different each other. The coding tables are used properly in response to a DCT/predictive coding change over signal to more improve a coding efficiency.

VCL Method (2)

Even though the coding tables used for variable length coding are used properly, in the VCL method (2), the variable length coding method of VLC circuit 10 is changed over in response to a DCT/predictive coding change over signal S5.

Namely when discrete cosine transforming, two dimensional variable length coding/decoding of zero run lengths and levels is executed, and when predictive coding, two dimensional variable length coding/decoding of a difference value between the zero run lengths and levels is executed.

As shown in FIG. 23, for instance, when the interframe difference signal transformed is supplied to the VLC circuit 10, this signal even which is a inter-frame difference signal motion compensated includes a correlation component between pixels remaining without removement (the portion of not "0" in FIG. 23).

For encoding this signal, it is needed to use a coding method to reduce correlation between pixels, so that the VLC circuit 10 effects coding by means of following algorithm.

Namely, when a pixel to be encoded is zero, a length of zero run is counted without encoding pixel data.

When a pixel to be encoded is not zero and the preceding pixel is zero, a set of zero run-length and pixel value (level) is two dimensional variable length coded.

When a pixel to be coded is not zero and the preceding pixel is not zero, the difference therebetween is calculated (DPCM), a set of differences between the zero run-length theretofore and pixel values (levels) is two dimensional variable length coded.

Construction of Decoding Apparatus

On the other hand, the decoding apparatus 2B is, as illustrated in FIG. 2, constructed to input, to the buffer 31, code bit stream inputs S31 transmitted from the encoding apparatus 2A through a optical disc and the like, and temporarily accumulate them.

An inverse variable length coding circuit 32 decodes whether the transmission data from the code bit stream input S31 is defined as DCT transformation data or predictive code transformation data from switch signals in association with the code bit stream inputs S31. The circuit 32 selects DCT or predictive coding in accordance with this information.

Herein, the inverse variable length coding circuit 32 executes inverse variable length code processing of the code bit stream inputs S31 and supplies them to an inverse DCT processing unit 33 and an inverse predictive coding processing unit 34.

The inverse DCT processing unit 33 includes a delay circuit 35, an inverse quantizing circuit 36 and an inverse DCT circuit 37. The processing unit 33 decodes the transmission picture from the coded bit stream input S31 in the procedures reverse to those in the DCT processing unit 5.

Further, the inverse predictive code processing unit 34 includes an inverse DPCM circuit 38, an inverse quantizing circuit 39 and an inverse predictive coding circuit 40. The processing unit 34 decodes the transmitted picture from the code bit stream input S31 in the procedures reverse to those in the predictive code processing unit 6.

Herein, the inverse quantizing circuits 36 and 39 is supplied quantization width control signals S32 and S33 from the inverse variable length coding circuit 32.

Further, the inverse DPCM circuit 38 is supplied scan direction designating signal S34 from the inverse variable length coding circuit 32. The inverse predictive coding circuit 40 is supplied a predictive value signal S35 from the inverse variable length coding circuit 32.

The decoding apparatus 2B decodes the transmission picture by means of a switch circuit 41 and an adder circuit 42 in combination with decode data S36 and S37 decoded by the inverse DCT processing unit 33 and the inverse predictive coding processing unit 34 in such processing procedures.

Further, at this moment, a prediction circuit 43 is switch-controlled by the inverse variable length coding circuit 32 and reproduces the original moving picture from the output of inverse predictive coding circuit 40 or inverse DCT circuit 37 which is processed per block.

Herein, an output of the prediction circuit 43 is derived via a switch circuit 44 to the adder circuit 42. The switch circuits 41 and 44 are switched by DCT/predictive code switch signals S38 supplied from the inverse variable length coding circuit 32.

Construction of Inverse DPCM Circuit 27

Transmission coded data coded by the DPCM System (3) is decoded by a variable shift DPCM decoder circuit 50 shown in 20.

More specifically, the variable shift DPCM decoder circuit 50 is constructed of an 8 bit×11 stage shift register 51 and three sets of flip-flops 52, 53 and 54 constituting a counter.

The variable shift DPCM decoder circuit 50 inputs pixel data S51 (FIG. 21B) which is raster-scanned on the block unit to an adder 56 as a delayed data S55 (FIG. 21F) which is obtained via a D flip-flop 55.

The adder 56 adds a output S56 (FIG. 21G) outputted from an 8-byte/1-byte selector 58 and supplies the added result to the 8 bit×11 stage shift register 51 via an AND circuit 57. Simultaneously, the adder circuit 56 derives it as a raster-scan pixel data output through a D flip-flop circuit 59.

The raster-scan pixel data outputted from the D flip-flop circuit 59 is outputted with a delay from the input signal for two clocks with respect to one clock signal S50 (FIG. 21A) per pixel.

3-bit shift quantity designation inputs S00, S01, S02 (FIG. 21E) for designating, as illustrated in FIG. 22, seven kinds of shift quantities are inputted further to the shift registers 52, 53 and 54 via logic arithmetic circuits 60, 61 and 62.

The respective shift registers 52, 53 and 54 are operated by clock signals S50. A flag S53 (FIG. 21D) indicating a head of each row is inputted to an input terminal LD.

Besides, flags S52 (FIG. 21C) each indicating a head of each block are inputted to clear input terminals CLR of the shift registers 52 and 53.

At this time, the shift registers 52, 53 and 54 operate respectively as shown in FIGS. 21H, 21K and 21L. A logical sum of outputs (FIG. 21I and 21J) from output terminals RC0 of the shift registers 53 and 54 is inputted to an input terminal ENP of the counter 52.

3-bit switch signals S57 (FIG. 21H) are thereby supplied to the selector 58 from output terminals QA, QB and QC of the shift register 52.

Operations of Embodiments

Based on the construction described above, the encoding apparatus 2A switches the switch circuit 4 in response to the interframe/frame timing switch signal S4 supplied from the prediction circuit 8. The picture data which have been interframe-coded or intraframe-coded in accordance with the transmission picture are outputted to the DCT processing unit 5 and the predictive coding processing unit 6.

The DCT processing unit 5 discrete-cosine-transforms the (8×8) pixel picture data by utilizing the two-dimensional correlation. The unit 5 further quantizes the transformed picture data on the basis of the quantization width control signal S9 inputted from the buffer circuit 11.

The predictive code processing unit 6 supplies the DPCM circuit 25 with the quantization data S10 obtained by quantizing the predictive-coded picture data with a predetermine quantization width sequentially through the predictive coding circuit 23 and the quantizing circuit 24, thereby making the picture data quantity further reduce.

Herein, the DPCM circuit 25 executes coding with respect to the respective blocks by each of the DPCM method (1), (2) and (3). The circuit 25 outputs a shift quantity or differential data at that time to the posterior variable length coding circuit 10 together with the flag indicating which transform system to use for coding.

Compared herein is the coded result by each coding system with respect to the block wherein the data is given with 8×8 pixels as a transmission picture and a dynamic range is $50/255$ or more.

The DPCM coding is at first effected in the vertical and horizontal direction with respect to the target block. The smaller of absolute value sums of remaining quantities after recoding is set as a coding target quantity of unidirectional DPCM coding.

Subsequently, the variable shift DPCM coding based on the DPCM method (3) is similarly executed with respect to the same block, and a coding target quantity at this time is obtained.

Counted are the blocks in which the coding target quantity of the variable DPCM coding is at that time less than 60% of the coding target quantity of unidirectional DPCM coding. It follows that the blocks in which the coding based on the variable shift DPCM coding is advantageous for a variety of transmission pictures occupy 6–35% of the whole.

Especially when many edges in the obliques direction are contained in the transmission picture, the coding is performed based on the variable shift DPCM coding system. It is therefore possible to reduce a greater amount of data by 40% or above than in the coding based on the unidirectional DPCM coding system.

The DPCM circuit 23 thereby outputs the picture data coded by the variable shift DPCM coding system pertaining to the DPCM method (3) to the variable length coding circuit 10 for such blocks that the oblique edges are contained in the same block.

When the coded data into which is coded by the DCT processing unit 5 or the predictive coding unit 6 is supplied via switch circuit 9 to the variable length coding circuit 10, this circuit 10 executes a variable length coding process of 8×8 pixels on the basis of VLC method (1) or VLC method (2).

Namely, when the judging circuit 7 obtains the judging result for predictive coding, the 8×8 pixel signal coded as shown in FIG. 23 with the predictive coding processing unit 6 is variable length coded. As the result, it is obtained coded data (3, 2) which has a non zero pixel value data of 2 and a zero run length data of 3 from head thereforto, because the pixel value data is at fourth column in first line.

There is next pixel value data of 2 at first row and fifth column, but the difference value is 0. The result data is (0, 0) having the difference data of 0 and a zero run length data of 0.

There is further pixel value data of 3 at first row and sixth column, the difference value is 1, and the result data is (0, 1) having the difference data of 1 and a zero run length of 0.

The codes as shown in FIG. 24A are generated in accordance with thus algorithm.

Hereto, the whole code quantity can be reduced in comparing with the conventional two dimensional variable length coding of the zero run length data and the level data as shown in FIG. 2B, in which sets of data marked with "*" generates near the zero data with difference from the conventional coded data of the zero run length and the level.

If the method of the two dimensional variable length coding for the difference value of zero run length data and level data is combined with the method of the two dimensional variable length coding for zero run length data and level data, code data (0, 0) having zero run length data of 0 and difference value data of 0 may merely be added to the another common data therebetween.

It is slightly increased in hardware structure to which a circuit taking difference and a code are merely added, when the device of the two dimensional variable length coding for the difference value of zero run length data and level data is combined with the device of the two dimensional variable length coding for zero run length data and level data.

According to the combined device, it is able to remove the correlation between pixels which is imperfectly removed ,even by a device used an interframe difference method with motion compensation, and to compress more data than a device composed of only the two dimensional variable length coding device.

Other Embodiments

Note that the embodiment discussed above provides a table of VLC circuit 10 with two kinds of tables for the zero run length and level and for the difference between zero run length and level. The table of VLC 10 may be one kind of table read out alternately in accordance with a coding method.

Namely, for example, successively, a code data (0, 1) of a table which is used as the VLC circuit 10 of a zero run length and level is used as a code data (0, 0) of a table which is used as the VLC circuit 10 of a difference value between zero run length and level, and a code data (0, 2) for use as the zero run length and level is used as a code data (0, 1) for the difference value between zero run length and level. The code table may be commonly used for two variable length coding by using thereof alternately thus.

Note that the embodiments discussed above have dealt with the case where when obtaining the differential data by the DPCM method (3), the data of each row are shifted right and left, and the shift quantity and the differential data are transmitted. The data shift quantity and the differential data are obtained with respect to each column and may be then transmitted.

The embodiments discussed above have dealt with the case where the present invention is applied to the encoding/decoding apparatuses 2A and 2B illustrated in FIGS. 1 and 2. The present invention is not, however, limited to these apparatuses but may be applicable widely to encoding/decoding apparatuses for transmitting the picture data while effecting predictive-coding.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A picture encoding method in which a picture is segmented into unit blocks including a plurality of pixels, and pixel data of said pixels are coded every unit block by selectively using as a coding method orthogonal transforming or predictive coding, and including the step of effecting various variable length coding on said pixel data in response to said coding method that is selected.

2. The picture encoding method according to claim 1, further comprising the steps of;

two dimensional variable length coding a combination of zero run length up to a pixel data to be coded and pixel value of the pixel data thus to be coded, when orthogonal transforming said unit blocks;

two dimensional variable length coding said combination of said zero run length up to a pixel data to be coded and difference value between signal value of the pixel data to be coded and pixel value of preceding pixel data, when predictive coding said unit blocks in which pixel value of the pixel data to be coded is not zero and pixel value of the preceding pixel data is not zero; and two dimensional variable length coding said combination of said zero run length up to said pixel data to be coded and pixel value of the pixel data to be coded, when predictive coding said unit blocks in which pixel value of said pixel data to be coded is not zero and pixel value of the preceding pixel data is zero.

3. A picture encoding method in which a picture is segmented into unit blocks including a plurality of pixels, and pixel data of said pixels are predictive coded every unit block, comprising the steps of:

two dimensional variable length coding a combination of a zero run length up to a pixel to be coded and difference value between pixel value of the pixel data to be coded and pixel value of preceding pixel data, when pixel value of the pixel data to be coded is not zero and pixel value of the preceding pixel data is not zero; and two dimensional variable length coding said combination of said zero run length up to said pixel to be coded and pixel value of the pixel data to be coded, when pixel value of said pixel data to be coded is not zero and pixel value of the preceding pixel data is zero.

4. A picture encoding method in which a picture is segmented into unit blocks including a plurality of pixels, and pixel data of said pixels are coded every unit block by selectively using orthogonal transforming or predictive coding, comprising coding a difference value between second pixel data being in circumference of a second position and first pixel data, after making said first pixel data within said unit block move from an initial position to said second position being at a distance of predetermined pixels, when coding said pixel data by said predictive coding.

5. The picture encoding method according to claim 4, further comprising a step of:

making said first pixel data move by predetermined pixels in the identical row or column per row or column unit.

6. The picture encoding method according to claim 1, 2, 4 or 5, wherein:

said orthogonal transformation includes a discrete cosine transformation.

7. A picture encoding method in which a picture is segmented into unit blocks and predictive coded every unit block, comprising the steps of:

making first picture data in said unit block move from an initial position to a second position being at a distance of predetermined pixels; and coding a difference between second picture data being in circumference of said second position and said first picture data.

8. The picture encoding method according to claim 7, further comprising a step of:

making said first picture data move by predetermined pixels in the identical row or column per row or column unit.

9. A picture recording medium on which is recorded coded data formed by a picture encoding method in which a picture is segmented into unit blocks including a plurality of pixels, and pixel data of said pixels are coded every unit block by selectively using as a coding method orthogonal transforming or predictive coding, and including the step of effecting various variable length coding on said pixel data in response to said coding method that is selected.

10. A picture decoding method for decoding encoded data which is generated from a picture that has been segmented into unit blocks including a plurality of pixels, and then the pixel data of said pixels were encoded selectively by orthogonal transforming or predictive coding every said unit block, said encoded data being effected alternatively inverse variable length coding in response to change over signals including in said encoded data with reference to said orthogonal transforming or predictive coding.

11. A picture decoding method for decoding encoded data which is generated from a picture that has been segmented into unit blocks including a plurality of pixels, and then the pixel data of said pixels were encoded selectively by orthogonal transforming or predictive coding every unit block, effecting predetermined inverse differential pulse code modulation processing on the basis of shift information included within said encoded data, when said encoded data is generated by said predictive encoding.

12. The picture decoding method according to claim 10 or 11, wherein:

said orthogonal transformation includes discrete cosine transformation.

13. A picture decoding method for decoding encoded data which is generated by a picture that has been segmented into unit blocks including a plurality of pixels, and then the pixel data of said pixels was predictive coding every unit block, effecting predetermined inverse differential pulse code modulation processing on the basis of shift information included within said encoded data.

14. A picture encoding apparatus in which a picture is segmented into unit blocks including a plurality of pixels, and then the pixel data of said pixels is encoded selectively by orthogonal transforming or predictive encoding, comprising:

first encoding means having an orthogonal transformation means for orthogonal transforming said unit block and first quantization means for quantizing coefficients obtained by said orthogonal transformation means;

second encoding means having a predictive coding means for predictive coding said unit block and second quantization means for quantizing coefficients obtained by said predictive coding means;

a judging means for judging a change between said first encoding means and said second encoding means;

a variable length coding means for tow dimensional variable coding:

a combination of a zero value run length preceding pixel data to be coded and a pixel value of said pixel data to be coded when said variable length coding means variable length codes a pixel data derived from said first encoding means, a combination of a zero value run length preceding pixel data to be coded and a difference value between a pixel data value of said pixel data to be coded and a pixel data value of preceding pixel data, when said variable length coding means variable length codes the pixel data derived from said second encoding means as well as when the pixel value of said picture data to be coded is not zero and the pixel value of said preceding pixel data is not zero, and a combination of a zero value run length preceding pixel data to be coded and pixel value of said pixel data to be coded, when said variable length coding means variable length codes pixel data derived from said second encoding means as well as when a pixel value of said pixel data to be coded is not zero and a picture value of preceding picture data is zero.

15. A picture encoding apparatus in which a picture is segmented into unit blocks including a plurality of pixels, and then pixel data of said pixels are encoded selectively by orthogonal transforming or predictive coding every unit block, comprising:

first encoding means having a orthogonal transformation means for orthogonal transforming said unit blocks and first quantization means for quantizing coefficient data obtained from said orthogonal transformation means;

second encoding means having a predictive coding means for predictive coding said unit block and second quantization means for quantizing the coefficient data obtained from said predictive coding means;

a judging means for judging a change between said first encoding means and said second encoding means; and a variable length encoding means having a first conversion table for converting the pixel data derived from said first encoding means and second conversion table for converting pixel data derived from said second encoding means.

16. The picture encoding apparatus according to claim 14 or 15, wherein:

said second encoding means includes differential pulse code modulation means for deriving predetermined difference value on the basis of the coefficient data of said second quantization means.

17. A picture encoding apparatus in which a picture is segmented into unit blocks including a plurality of pixels, and then the pixel data of said pixels are encoded selectively by orthogonal transforming or predictive coding every unit block, comprising:

first encoding means having a orthogonal transformation means for orthogonal transforming said unit blocks and first quantization means for quantizing coefficient data obtained from said orthogonal transformation means;

second encoding means having a predictive coding means for predictive coding said unit blocks, second quantization means for quantizing coefficient data obtained from said predictive coding means and differential pulse code modulation means for coding a difference value between second pixel data in circumference of a second position and first pixel data, after making said first pixel data obtained from said second quantization means move from an initial position to said second position being at a distance corresponding to predetermined pixels, a judging means for judging a change between said first encoding means and said second encoding means; and a variable length coding means for variable length coding first picture data derived from said first encoding means or second picture data derived from said second encoding means.

18. The picture encoding apparatus according to claim 17, wherein:

said differential pulse code modulation means is operable to move pixel data obtained from said second quantization means in said second encoding means to identical row and column locations at a distance corresponding to predetermined pixels by a row and column unit, and to calculate a difference value between the moved first pixel data and said second pixel data in row and column being in circumference of said second position.

19. The picture encoding apparatus according to claim 14, 15, 17 or 18, wherein:

said orthogonal transformation means is a discrete cosine transformation means for discrete cosine transforming said unit blocks.

20. A picture decoding apparatus for decoding encoded data encoded from a picture that has been segmented into unit blocks including a plurality of pixels, and pixel data of said pixels have been encoded selectively by orthogonal transforming or predictive coding every unit block, comprising:

an inverse variable length coding means for alternatively inverse variable length coding said encoded data in response to a change over signal for said orthogonal transformation or predictive coding and included in said coded data;

first decoding means having first inverse quantization means for inverse quantizing data obtained from said inverse variable length coding means and inverse orthogonal transformation means for inverse orthogonal transforming coefficients obtained from said first inverse quantization means;

second decoding means having second inverse quantization means for inverse quantizing data obtained from said inverse variable length coding means and an inverse predictive coding means for inverse predictive coding coefficients obtained from said second inverse quantization means; and a selection means for selecting the decoded data decoded by said fist or second decoding means in response to said changing over signal.

21. A picture decoding apparatus for decoding encoded data generated from a picture that has been segmented into unit blocks including a plurality of pixels, and pixel data of said pixels have been encoded selectively by orthogonal transforming or predictive coding every unit block, comprising:

an inverse variable length coding means for inverse variable length coding said encoded data;

first decoding means having first inverse quantization means for inverse quantizing data obtained from said inverse variable length coding means and an inverse orthogonal transformation means for inverse orthogonal transforming coefficients obtained from said first inverse quantization means;

second decoding means having an inverse differential pulse code modulation means for inverse differential pulse code modulation processing data obtained from said inverse variable length coding means in a predetermined manner on the basis of shift information included in said encoded data, second inverse quantization means for inverse quantizing the inverse pulse code modulation processed data and an inverse predictive coding means for inverse predictive coding coefficients obtained from said second inverse quantization means; and a selection means for selecting decoded data coded by said first or second decoding means in response to a change over signal representative of said orthogonal transforming or predictive coding included in said decoded data.

22. The picture decoding apparatus according to claim 20 or 21, wherein:

said orthogonal transformation includes discrete cosine transformation, and said inverse orthogonal transformation means is an inverse discrete cosine transformation means for inverse discrete cosine transforming the coefficients from said first inverse quantization means.

\* \* \* \* \*